United States Patent
Lee et al.

(10) Patent No.: US 9,315,093 B2
(45) Date of Patent: Apr. 19, 2016

(54) BATTERY MODULE CONFIGURATION STRUCTURE FOR ARTICULATED ELECTRIC BUS

(71) Applicant: Aleees Eco Ark Co. Ltd., Bade, Taoyuan County (TW)

(72) Inventors: Hsun-Sheng Lee, Bade (TW); Neng-Han Yu, Bade (TW); Chung-Wei Wen, Bade (TW); Ching-An Shu, Bade (TW)

(73) Assignee: ALEEES ECO ARK CO. LTD., Bade, Taoyuan County (TW)

( * ) Notice: Subject to any disclaimer, the term of this patent is extended or adjusted under 35 U.S.C. 154(b) by 0 days.

(21) Appl. No.: 14/404,332

(22) PCT Filed: May 31, 2013

(86) PCT No.: PCT/CN2013/076557
§ 371 (c)(1),
(2) Date: Nov. 26, 2014

(87) PCT Pub. No.: WO2013/178089
PCT Pub. Date: Dec. 5, 2013

(65) Prior Publication Data
US 2015/0165885 A1    Jun. 18, 2015

Related U.S. Application Data

(60) Provisional application No. 61/654,549, filed on Jun. 1, 2012.

(51) Int. Cl.
*B60K 1/04* (2006.01)
*B60L 11/18* (2006.01)

(52) U.S. Cl.
CPC ............... *B60K 1/04* (2013.01); *B60L 11/1822* (2013.01); *B60L 11/1864* (2013.01); *B60L 11/1877* (2013.01); *B60K 2001/0405* (2013.01);
(Continued)

(58) Field of Classification Search
CPC ............. B60K 1/04; B60K 2001/0405; B60L 11/1877; B60L 11/1822; B60L 11/1864
See application file for complete search history.

(56) References Cited

U.S. PATENT DOCUMENTS 384,911 A * 6/1888 Shawhan ................... 105/51
417,259 A * 12/1889 Hunter ....................... 104/34
(Continued)

FOREIGN PATENT DOCUMENTS

CN    101032981    9/2007
CN    101323255    12/2008
(Continued)

OTHER PUBLICATIONS

Reick, Gerhard, et al., "Focal Point: electric drive systems for city buses," XP000642978, 1996, pp. 4-11.

*Primary Examiner* — Brodie Follman
*Assistant Examiner* — Brian Cassidy
(74) *Attorney, Agent, or Firm* — Kirton McConkie; Evan R. Witt

(57) ABSTRACT

A battery module configuration structure for an articulated electric bus includes a vehicle body, a plurality of wheel shafts and a plurality of battery modules. The wheel shafts are respectively disposed on a bottom of the vehicle body. The battery modules are disposed in an interior of the vehicle body and correspondingly located at an upper area of at least one of the wheel shafts.

6 Claims, 3 Drawing Sheets

(52) U.S. Cl.
CPC .......... *B60L2200/18* (2013.01); *Y02T 10/7005* (2013.01); *Y02T 10/7061* (2013.01); *Y02T 10/7072* (2013.01); *Y02T 90/124* (2013.01); *Y02T 90/14* (2013.01)

(56) References Cited

U.S. PATENT DOCUMENTS

| | | | | |
|---|---|---|---|---|
| 438,192 | A | * | 10/1890 | Main ............................... 105/51 |
| 1,337,334 | A | * | 4/1920 | Sloane ........................... 105/51 |
| 5,452,912 | A | * | 9/1995 | Boucquey .................... 280/403 |
| 2009/0320715 | A1 | * | 12/2009 | Morita et al. .................. 105/51 |
| 2012/0186888 | A1 | * | 7/2012 | Ross ........................... 180/65.31 |
| 2013/0000997 | A1 | * | 1/2013 | Peng et al. ................... 180/65.6 |

FOREIGN PATENT DOCUMENTS

| | | |
|---|---|---|
| CN | 201833864 | 5/2011 |
| CN | 102110844 | 6/2011 |
| CN | 102205859 | 10/2011 |
| CN | 202130297 | 2/2012 |
| DE | 102009045448 | 2/2011 |
| DE | 1020090454481 | 2/2011 |
| FR | 2737694 | 2/1997 |
| JP | H11115504 | 4/1999 |
| JP | 2000-351329 | 12/2000 |
| JP | 200274442 | 9/2002 |
| JP | H11139167 | 5/2004 |
| JP | 2011120390 | 6/2011 |

* cited by examiner

BATTERY MODULE CONFIGURATION STRUCTURE FOR ARTICULATED ELECTRIC BUS

FIELD OF THE INVENTION

The present invention relates to a battery module configuration structure for an electric vehicle, and more particularly to a battery module configuration structure for an articulated electric bus.

BACKGROUND OF THE INVENTION

With the prevalence of green energy concept, the related research and development of electric vehicles flourish. In general, the power source of the electric vehicle is the battery modules inside the vehicle. In order to make the electric vehicle be driven and achieve a certain driving force, normally a plurality of battery module are required to be configured for supplying enough power. A considerable space of the electric vehicle is occupied while configuring the plurality of battery modules, so a battery module configuration structure for an articulated electric bus becomes a topic to be developed.

In general, having different functions, hardware, and limitations under different national safety regulations in different types or models of electric vehicles makes the battery module configuration structures and methods different. The plural battery modules of small-sized electric vehicles (e.g. electric cars) are usually disposed in the trunk of the car body. However, being the public transportation vehicles, the large-sized electric vehicles (e.g. the electric motor bus or electric bus) usually have larger and heavier vehicle bodies, so the battery modules having larger capacity, larger sizes, heavier weights and larger amounts are required to provide enough driving force and endurance. In the past, due to the bottleneck and the insufficiency of the research and development of batteries and related hardware devices, such as charging stations or battery exchange stations, the research and development of electric buses are scarce and slow. In recent years, due to the breakthrough in the battery technology and the reinforcement of the related hardware, the research, the development and the application of electric buses are led to be gradually implemented. Currently, a general electric bus in the development of electric buses has a length of about 12 meters, and the plurality of battery modules are usually configured inside the vehicle of the electric bus, and disposed on two sides of the aisle and between the front axle and the rear axle. In order to maintain a certain amount of seats, a plurality of seats are disposed on the plural battery modules in an electric bus (i.e. the seats located at two sides of the aisle are disposed on the plural battery modules), such that the seats of the electric bus have to be elevated a certain height, thereby affecting the comfort of the passengers while sitting on the seats. An ladder is also required so as to be disposed on the exit/entrance or near the seats, which causes that the passengers have to use the ladder, and further the pick-up time and the drop-off time are increased, thereby affecting the travel time of the electric bus and being inconvenient for wheelchair access. In addition, when the electric bus is waded through water or splashed by rain in traveling, it is easy to be damped or moisture-intruded due to the arrangement position and method of the battery modules, thereby affecting the lifetime of the battery modules and the safety of the electric bus. Moreover, when the electric bus is impacted or an accident is occurred, the probability of damage is increased due to the arrangement position and method of the battery modules, thereby affecting the structure and safety of the vehicle body. In particular, the heat-dissipation efficiency cannot be enhanced by directly air-conditioning because of the arrangement position and method of the battery modules of the electric bus.

In recent years, the articulated bus is widely popularized and applied because the articulated bus has greater carrying capacity, which can reduce the costs of high-cost hardware buildings such as MRT or LRT. The articulated bus consists of two rigid compartments jointed with each other, and the total length of the articulated bus is about 18 meters. A passenger can move through the two rigid compartments as free as taking MRT. About 120 to 200 people can be simultaneously carried by the articulated bus. The articulated bus is usually utilized for downtown or airport accessing in replace of MRT or LRT as a quick, large-amount and short-distance public transport. Under this circumstance, the articulated bus is commonly a low-floor articulated bus. The so-called "low-floor" means that there is no stairs/ladders disposed from the front door (near the driver's seat in the first rigid compartment) to the aisle in front of the shaft region of the second rigid compartment along the aisle of the first rigid compartment, and the floors of the first rigid compartment and the second rigid compartment are planes. In other words, it is convenient for a passenger to get on/off without a ladder quickly, and it allows a wheelchair to access. However, the research and development of the articulated bus is still incomplete. Meanwhile, in the development of the articulated bus, the battery module configuration structures and methods have to be considered according to the requirements of the public transport, the hardware conditions and limitations of the vehicle body, the general specifications of countries, the rapidity and convenience of changing up battery power, the convenience and security of passengers and space utilizations, thereby reducing and avoiding the aforementioned problems. Therefore, there is a need of providing an improved battery module configuration structure for an articulated electric bus in order to eliminate the above drawbacks.

SUMMARY OF THE INVENTION

It is an object of the present invention to provide a battery module configuration structure for an articulated electric bus in order to increase or maintain the space usage, and enhance the carrying capacity.

The present invention also provides a battery module configuration structure for an articulated electric bus. The effects of the lifetime of the battery modules and the safety of the articulated electric bus caused by the damping or the moisture-intruding can be avoided. The probability of damage of the battery modules is reduced when the articulated electric bus is impacted or an accident is occurred. The deformation of the vehicle body or the vehicle chassis is avoided, and the air-conditioning system of the articulated electric bus can be utilized for enhancing the heat-dissipating efficiency.

The present invention also provides a battery module configuration structure for an articulated electric bus, among which the articulated electric bus is a low-floor articulated electric bus, so that it is convenient to pick-up or drop-off passengers, and is convenient for wheelchair to access. Also, the space usage of the articulated electric bus can be increased or maintained, and the carrying capacity is enhanced.

In accordance with an aspect of the present invention, there is provided a battery module arrangement structure for an articulated electric bus. The battery module arrangement structure for the articulated electric bus comprises a vehicle body, a plurality of wheel shafts and a plurality of battery modules. The wheel shafts are disposed on a bottom of the vehicle body. The battery modules are disposed in an interior of the vehicle body and correspondingly located above at least one of the wheel shafts.

In accordance with another aspect of the present invention, there is provided a battery module arrangement structure for an articulated electric bus. The battery module arrangement structure for the articulated electric bus comprises a first rigid compartment, a second rigid compartment, a joint unit, a first wheel shaft, a second wheel shaft, a third wheel shaft and a plurality of battery modules. The joint unit is jointed with the first rigid compartment and the second rigid compartment. The first wheel shaft is disposed on a bottom of the first rigid compartment. The second wheel shaft is disposed on the bottom of the first rigid compartment. The third wheel shaft is disposed on a bottom of the second rigid compartment. The battery modules are disposed in an interior of the first rigid compartment and an interior of the second rigid compartment and correspondingly located above the first wheel shaft, the second wheel shaft and the third wheel shaft.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
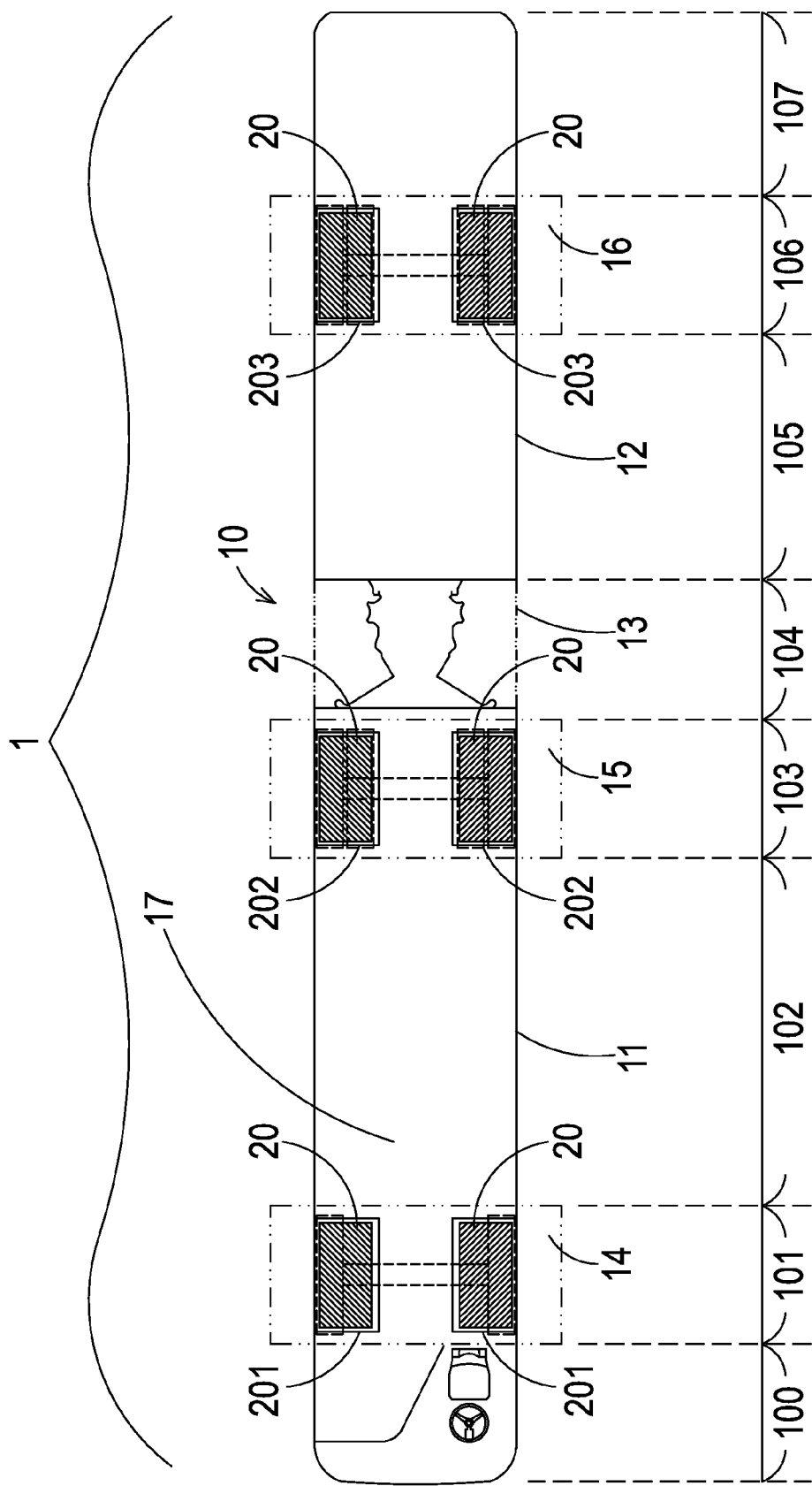
FIG. 1 schematically illustrates the top perspective view of a battery module configuration structure for an articulated electric bus according to a preferred embodiment of the present invention.
Figure 2:
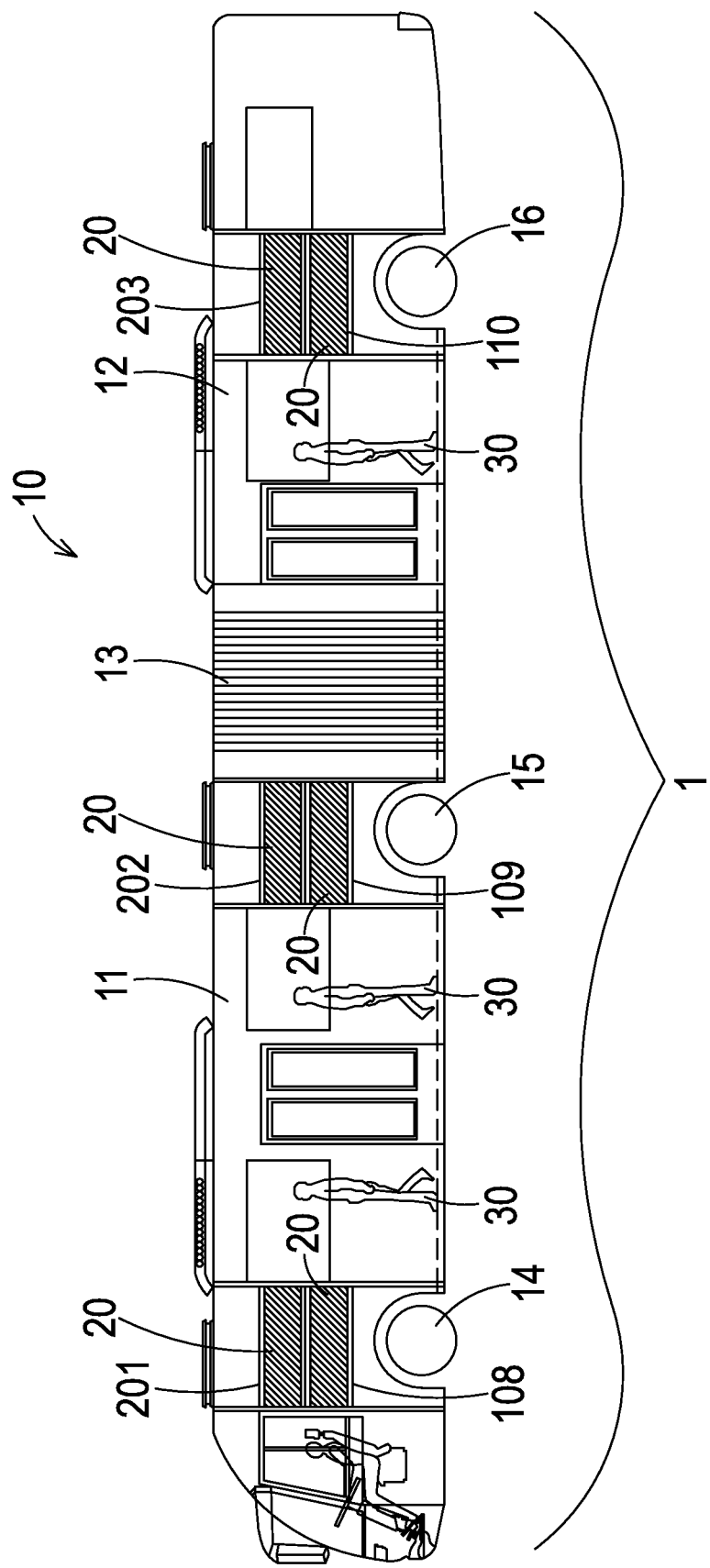
FIG. 2 schematically illustrates the side view of a battery module configuration structure for an articulated electric bus according to a preferred embodiment of the present invention.

Please refer to FIG. 1 and FIG. 2. FIG. 1 schematically illustrates the top perspective view of a battery module configuration structure for an articulated electric bus according to a preferred embodiment of the present invention. FIG. 2 schematically illustrates the side view of a battery module configuration structure for an articulated electric bus according to a preferred embodiment of the present invention. The articulated electric bus 1 of the present invention comprises a vehicle body 10, a plurality of battery modules 20, and a power converting and driving system (not shown), among which the vehicle body 10 comprises a first rigid compartment 11, a second rigid compartment 12 and a joint unit 13. The first rigid compartment 11 and the second rigid compartment are jointed with each other through the joint unit 13 and forming an aisle 17 in an interior of the first rigid compartment 11 and an interior of the second rigid compartment 12, so that a passenger 30 can freely walk through the aisle 17, which is from the first rigid compartment 11, the second rigid compartment 12 and the joint unit 13. The energy for operating the converting and driving system (not shown) of the articulated electric bus 1 is provided by the battery modules 20, such that the articulated electric bus 1 can be driven, and the articulated electric bus 1 has certain endurance. In some embodiments, the total length of the vehicle body 10 of the articulated electric bus 1 can be about 18 meters, but not limited thereto. The carrying capacity of the articulated electric bus 1 is about 120 to 200 people, but not limited herein.

The articulated electric bus 1 further comprises a first wheel shaft 14 (or called front wheel shaft), a second wheel shaft 15 (or called middle wheel shaft) and a third wheel shaft 16 (or called rear wheel shaft) sequentially disposed on a bottom of the vehicle body 10. In this embodiment, the first wheel shaft 14 and the second wheel shaft 15 are disposed on a bottom of the first rigid compartment 11, and the third wheel shaft 16 is disposed on a bottom of the second rigid compartment 12. Additionally, the vehicle body 10 of the articulated electric bus 1 can be sequentially divided into, from the front to the rear, a front region 100, a front wheel shaft region 101, a first car body region 102, a middle wheel shaft region 103, a joint unit region 104, a second car body region 105, a rear wheel shaft region 106 and a rear region 107. The first wheel shaft 14 and the second wheel shaft 15 are respectively disposed corresponding to the front wheel shaft region 101 and the middle wheel shaft region 103 of the vehicle body 10 (or the first rigid compartment 11), such that the front wheel shaft region 101 and the middle wheel shaft region 103 of the vehicle body 10 respectively have two first high platform portions 108 and two second high platform portions 109, among which the two first high platform portions 108 are disposed on two sides of the aisle 17 of the vehicle body 10 and disposed opposite to each other, the two second high platform portions 109 are disposed on two sides of the aisle 17 of the vehicle body 10 and disposed opposite to each other. The third wheel shaft 16 is disposed corresponding to the rear wheel shaft region 106 of the vehicle body 10 (or the second rigid compartment 12), such that the rear wheel shaft region 106 has two third high platform portions 110, among which the two third high platform portions 110 are disposed on two sides of the aisle 17 of the vehicle body 10 and disposed opposite to each other. In this embodiment, a plurality of battery receiving boxes 201, 202 and 203 are correspondingly located above the two first high platform portions 108, the two second high platform portions 109 and the two third high platform portion 110 of the front wheel shaft region 101, the middle wheel shaft region 103 and the rear wheel shaft region 106 of the vehicle body 10, such that the battery modules 20 are replaceably received in the spaces of the battery receiving boxes 201, 202 and 203. In other words, a plurality of battery receiving boxes 201, 202 and 203 are disposed in the interior of the vehicle body 10 (or the first rigid compartment 11 and the second rigid compartment 12) and correspondingly located above the first wheel shaft 14, the second wheel shaft 15 and the third wheel shaft 16 for replaceably receiving the battery modules 20. The battery receiving boxes 201, 202 and 203 can be disposed adjacent to two sides of the vehicle body 10, so that the battery modules 20 are replaceably received by the battery receiving boxes 201, 202 and 203.

Figure 3:
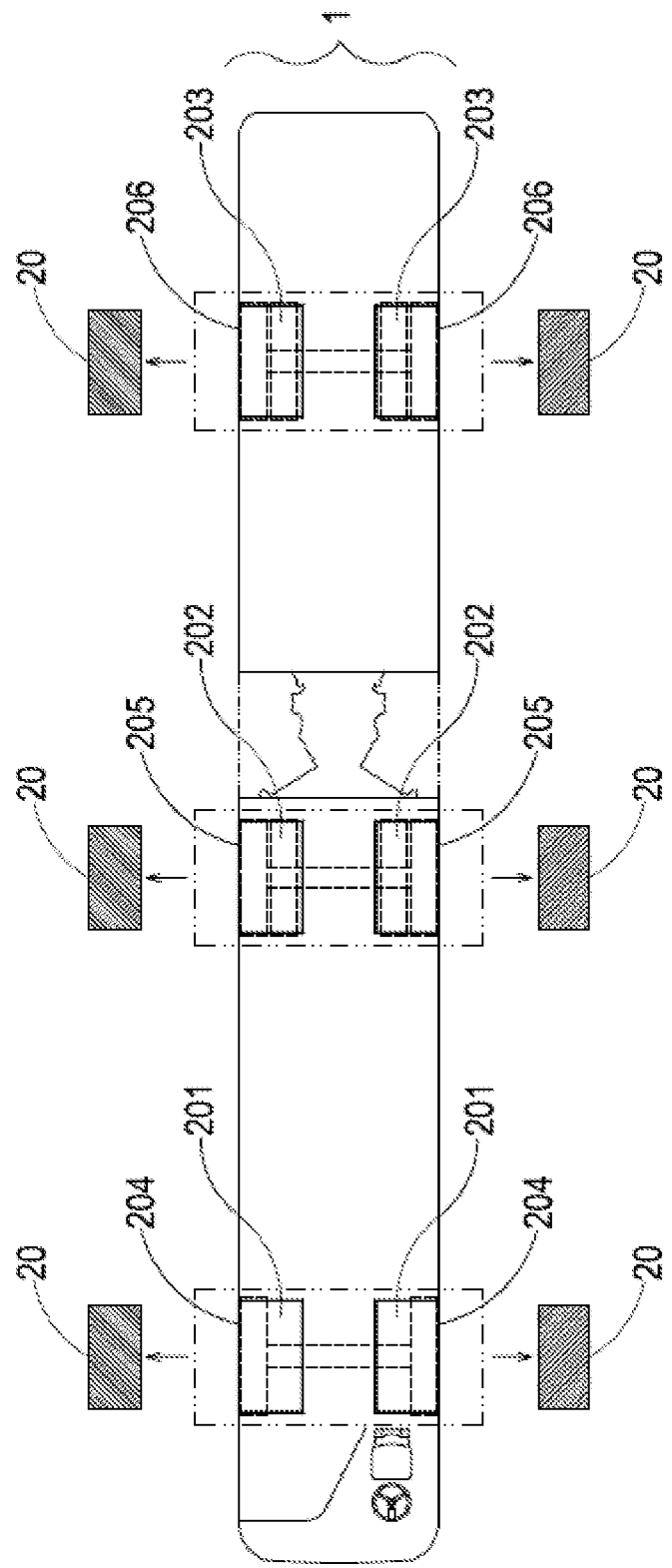
FIG. 3 schematically illustrates the replacement of battery modules of a battery module configuration structure for an articulated electric bus according to a preferred embodiment of the present invention.

FIG. 3 schematically illustrates the replacement of battery modules of a battery module configuration structure for an articulated electric bus according to a preferred embodiment of the present invention. In some embodiments, the two sides of the vehicle body 10 have a plurality of door panels 204, 205 and 206 corresponding to the battery receiving boxes 201, 202 and 203. When the battery modules 20 are respectively received in the spaces of the battery receiving boxes 201, 202 and 203, the door panels 204, 205 and 206 are locked for closing the battery modules 20. When the power of the battery modules 20 is consumed to a certain extent, the battery modules can be replaced, so that the utilizing efficiency of the articulated electric bus 1 is enhanced without charging the entire vehicle (i.e. causing the reduction of utilizing efficiency). When the battery modules 20 are required to be replaced, the door panels 204, 205 and 206 can be unlocked and opened form an exterior of the vehicle 10, so that the battery modules 20 can be moved out the vehicle body 10 through a manually operation or an automatically operation at a battery switching station, the to-be-installed battery modules 20 are placed in the spaces of the battery receiving boxes 201, 202 and 203, and then the door panels 204, 205 and 206 are locked. As a result, the replacement of the battery modules 20 is implemented in such a easy, safe and convenient way. In some embodiments, the amount of the battery modules 20 can be adjusted for meeting the practical demands, but not limited thereto.

In this embodiment, the articulated electric bus 1 is a low-floor articulated electric bus. The so-called "low-floor" means that the floor inside the vehicle body 10 is a plane and there is no stair on the aisle 17, among which the aisle 17 is extended between the front region 100, the front wheel shaft region 101, the first car body region 102, the middle wheel shaft region 103, the joint unit region 104, the second car body region 105 and the rear wheel shaft region 106, but not limited thereto. In other words, the floor, from the front door, which is adjacent to the driver's seat of the first rigid compartment 11, to the third wheel shaft 16 (i.e. the rear wheel shaft region 106) of the second rigid compartment 12 along the aisle 17 of the first rigid compartment 11, the second rigid compartment 12 and the joint unit 13, inside the vehicle body 10 is a plane, and none of stair is disposed on the aisle 17. In addition, in the articulated electric bus, the height from the chassis to the floor of the vehicle body 10 is about 15 centimeters, and the height from the floor of the vehicle body 10 to the ground is about 35 centimeters, but not limited thereto. Therefore, when a passenger 30 takes the articulated electric bus 1, the chassis of the articulated electric bus 1 can become a type of low-floor, such that it is convenient for the passenger 30 to get on/off without a ladder, and is also convenient for a wheelchair to access.

According to an idea of the present invention, the battery module arrangement structure for the articulated electric bus comprises a vehicle body 10, a plurality of wheel shafts 14, 15 and 16 (i.e. the first wheel shaft 14, the second wheel shaft 15 and the third wheel shaft 16), and a plurality of battery modules 20. The wheel shafts 14, 15 and 16 are disposed on a bottom of the vehicle body 10. The battery modules 20 are disposed in an interior of the vehicle body 10 and correspondingly located above at least one of the wheel shafts 14, 15 and 16, so that the spaces of the vehicle body 10 upon the wheel shafts 14, 15 and 16 can be utilized by the battery modules 20, the space usage of the articulated electric bus 1 can be increased or maintained, and the carrying capacity of the articulated electric bus 1 is enhanced. Moreover, because the battery modules 20 are disposed above the first high platform portion 108, the second high platform portion 109 and the third high platform portion 110 inside the vehicle body 10 and are farther from the ground, the battery modules 20 are avoided from being damped or moisture-intruded, which causes effects of the lifetime of the battery modules 20 and the safety of the articulated electric bus 1. When the articulated electric bus 1 is impacted or an accident is occurred, the probability of damage of the battery modules 20 is reduced. Furthermore, since the battery modules 20 are arranged upon the plural wheel shafts 14, 15 and 16 and shock absorptions are provided by the tires linked with the wheel shafts 14, 15 and 16, a buffer and a shock absorption are provided to the battery modules 20 for avoiding the deformations of the vehicle body 10 or the chassis due to the weight of the battery modules 20. In particular, because the battery modules 20 are received in the battery receiving boxes 201, 202 and 203, which are arranged above the first high platform portion 108, the second high platform portion 109 and the third high platform portion 110, and the battery receiving boxes 201, 202 and 203 are closer to the outlet of the air-conditioning system of the articulated electric bus 1, the air flow can be divided and guided to the battery receiving boxes 201, 202 and 203 for heat dissipation, thereby enhancing the heat-dissipating efficiency of the battery modules 20.

From the above descriptions, the present invention provides a battery module configuration structure for an articulated electric bus in order to increase/maintain the space usage and enhance the carrying capacity. Moreover, the effects of the lifetime of the battery modules and the safety of the articulated electric bus caused by the damping or the moisture-intruding can be avoided. The probability of damage of the battery modules is reduced when the articulated electric bus is impacted or an accident is occurred. The deformation of the vehicle body or the vehicle chassis is avoided, and the air-conditioning system of the articulated electric bus can be utilized for enhancing the heat-dissipating efficiency. Furthermore, since the battery modules are configured as replaceable battery modules, the battery modules can be replaced through a manually operation or an automatically operation at a battery switching station. Meanwhile, the present invention also provides a battery module configuration structure for an articulated electric bus, among which the articulated electric bus is a low-floor articulated electric bus, so that it is convenient to pick-up or drop-off passengers, and is convenient for wheelchair to access. Also, the space usage of the articulated electric bus can be increased or maintained, and the carrying capacity is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A battery module arrangement structure for an articulated electric bus, comprising:
    a vehicle body comprising a first rigid compartment, a second rigid compartment and a joint unit, wherein the first rigid compartment and the second rigid compartment are jointed by the joint unit, and the first rigid compartment and the second rigid compartment are passenger-carrying compartments;
    a plurality of wheel shafts disposed on a bottom of the vehicle body, wherein the wheel shafts comprise a first wheel shaft, a second wheel shaft and a third wheel shaft, and wherein the first wheel shaft and the second wheel shaft are disposed on a bottom of the first rigid compartment, and the third wheel shaft is disposed on a bottom of the second rigid compartment,
    wherein the vehicle body comprises a front wheel shaft region aligned with the first wheel shaft, a middle wheel shaft region aligned with the second wheel shaft, and a rear wheel shaft region aligned with the third wheel shaft, wherein the front wheel shaft region and the middle wheel shaft region respectively have two first high platform portions and two second high platform portions, and the rear wheel shaft region has two third high platform portions;

a plurality of battery modules disposed in an interior of the vehicle body and correspondingly located above at least one of the wheel shafts; and a plurality of battery receiving boxes disposed in the interior of the vehicle body and correspondingly located above the wheel shafts for replaceably receiving the battery modules, wherein the battery receiving boxes are located above the two first high platform portions, the two second high platform portions and the two third high platform portions.

2. The battery module arrangement structure for an articulated electric bus according to claim 1, wherein the battery receiving boxes are disposed adjacent to two sides of the vehicle body, and the two sides of the vehicle body have a plurality of door panels corresponding to the battery receiving boxes.

3. The battery module arrangement structure for an articulated electric bus according to claim 1, wherein the interior of the vehicle body has an aisle.

4. The battery module arrangement structure for an articulated electric bus according to claim 3, wherein the two first high platform portions are disposed on two sides of the aisle of the vehicle body and disposed opposite to each other, the two second high platform portions are disposed on two sides of the aisle of the vehicle body and disposed opposite to each other, and the two third high platform portions are disposed on two sides of the aisle of the vehicle body and disposed opposite to each other.

5. The battery module arrangement structure for an articulated electric bus according to claim 1, wherein the articulated electric bus is a low-floor articulated electric bus.

6. A battery module arrangement structure for an articulated electric bus, comprising:

a first rigid compartment;

a second rigid compartment;

a joint unit jointed with the first rigid compartment and the second rigid compartment;

a first wheel shaft disposed on a bottom of the first rigid compartment;

a second wheel shaft disposed on the bottom of the first rigid compartment;

a third wheel shaft disposed on a bottom of the second rigid compartment, wherein the first rigid compartment comprises a front wheel shaft region aligned with the first wheel shaft and a middle wheel shaft region aligned with the second wheel shaft, the second rigid compartment comprises a rear wheel shaft region aligned with the third wheel shaft, the front wheel shaft region and the middle wheel shaft region respectively have two first high platform portions and two second high platform portions, and the rear wheel shaft region has two third high platform portions;

a plurality of battery modules disposed in an interior of the first rigid compartment and an interior of the second rigid compartment and correspondingly located above the first wheel shaft, the second wheel shaft and the third wheel shaft; and a plurality of battery receiving boxes disposed in the interior of the first rigid compartment and the second rigid compartment and correspondingly located above the first wheel shaft, the second wheel shaft and the third wheel shaft for replaceably receiving the battery modules, wherein the battery receiving boxes are located above the two first high platform portions, the two second high platform portions and the two third high platform portions.

* * * * *